US012657537B2

(12) United States Patent
Nakamura

(10) Patent No.: US 12,657,537 B2
(45) Date of Patent: Jun. 16, 2026

(54) INFORMATION PROCESSING APPARATUS, INFORMATION PROCESSING SYSTEM, INFORMATION PROCESSING METHOD, AND RECORDING MEDIUM FOR CONTROLLING JOB EXECUTION BASED ON AVAILABILITY OF A PLACEMENT AREA

(71) Applicant: Ayano Nakamura, Tokyo (JP)

(72) Inventor: Ayano Nakamura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 22 days.

(21) Appl. No.: 18/731,614

(22) Filed: Jun. 3, 2024

(65) Prior Publication Data

US 2025/0005480 A1 Jan. 2, 2025

(30) Foreign Application Priority Data

Jun. 27, 2023 (JP) ................................. 2023-105226

(51) Int. Cl.
*G06Q 10/0631* (2023.01)
(52) U.S. Cl.
CPC .............................. *G06Q 10/06316* (2013.01)
(58) Field of Classification Search
CPC .......................................... G06Q 10/00–50/00
USPC ............................................... 705/7.11–7.42
See application file for complete search history.

(56) References Cited

U.S. PATENT DOCUMENTS

| | | | | |
|---|---|---|---|---|
| 7,937,705 B1 * | 5/2011 | Prael | .......................... | G06F 9/50 |
| | | | | 709/201 |
| 2008/0049251 A1 * | 2/2008 | Shimada | .................... | B42B 4/00 |
| | | | | 358/1.15 |

| | | | | |
|---|---|---|---|---|
| 2011/0279853 A1 * | 11/2011 | Yamada | ................ | G06F 3/1203 |
| | | | | 358/1.15 |
| 2015/0339549 A1 * | 11/2015 | Takasu | .................. | G06F 3/1212 |
| | | | | 358/1.15 |
| 2017/0017443 A1 * | 1/2017 | Sato | .................... | H04N 1/00915 |
| 2022/0297462 A1 * | 9/2022 | Ishida | .................. | G06K 15/404 |
| 2023/0014534 A1 * | 1/2023 | Nomura | .................. | G06F 3/121 |
| 2023/0384999 A1 * | 11/2023 | Matsuo | ................. | G06F 3/1243 |
| 2024/0287721 A1 * | 8/2024 | Hathorn | ................. | D06F 34/32 |

FOREIGN PATENT DOCUMENTS

JP 2018-077582 A 5/2018

OTHER PUBLICATIONS

U.S. Appl. No. 18/517,533, filed Nov. 22, 2023.

* cited by examiner

*Primary Examiner* — Alan S Miller

(74) *Attorney, Agent, or Firm* — IPUSA, PLLC

(57) ABSTRACT

An information processing apparatus includes circuitry that: acquires a job to be executed by a job processing apparatus; determines whether or not there is a free space in a placement area, the placement area being an area where work products obtained by the job processing apparatus executing the job are to be placed; in a case where there is no free space in the placement area, calculates an estimated completion time of the job when the job is immediately started, and a space available time when the free space becomes available in the placement area; and in a case where the estimated completion time is equal to or later than the space available time, instructs the job processing apparatus to start executing the job.

10 Claims, 11 Drawing Sheets

FIG. 1

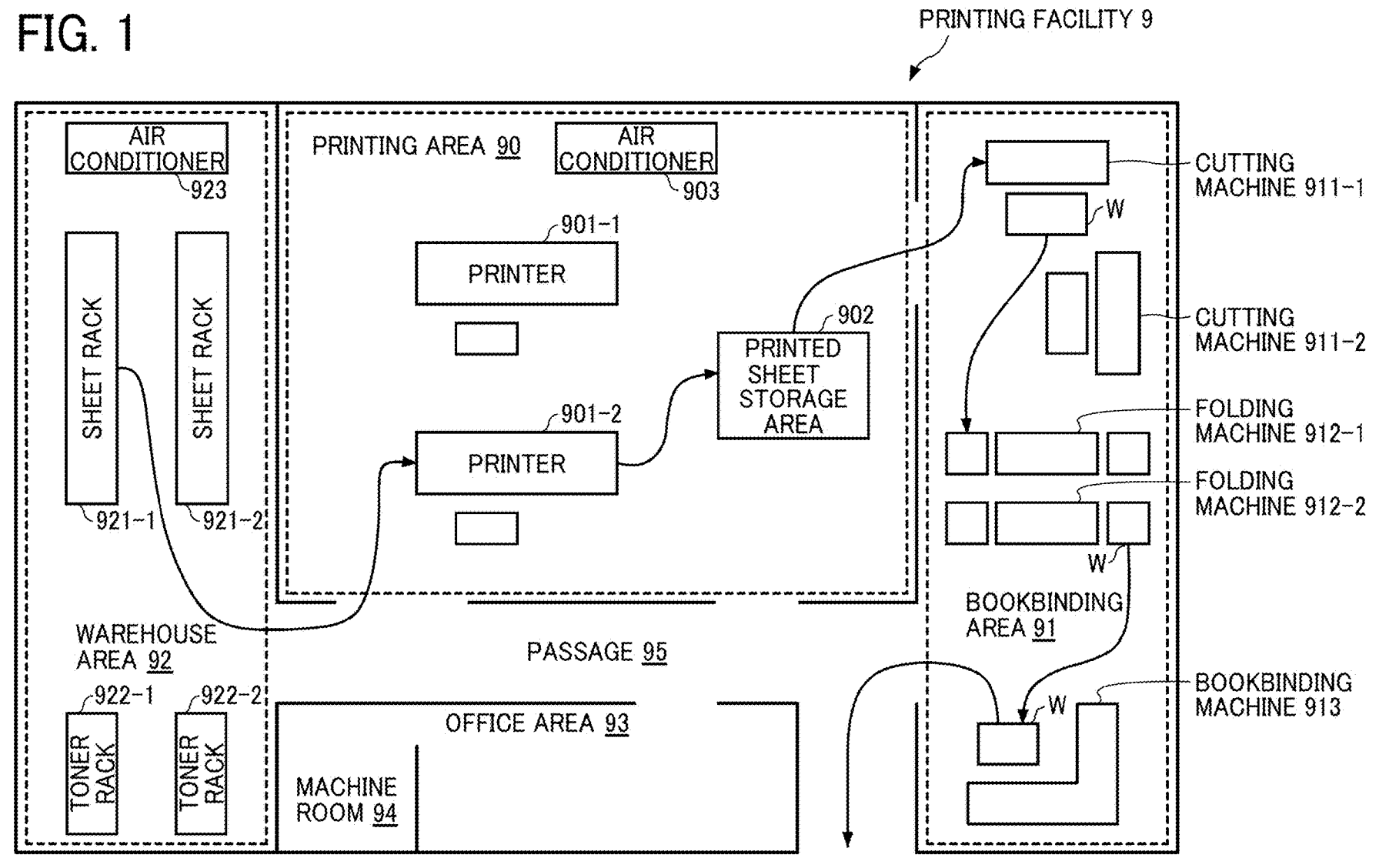

PRINTING FACILITY 9

CUTTING MACHINE 911-1
CUTTING MACHINE 911-2
FOLDING MACHINE 912-1
FOLDING MACHINE 912-2
BOOKBINDING MACHINE 913

W

BOOKBINDING AREA 91

W

PRINTING AREA 90

AIR CONDITIONER 903

PRINTER 901-1

PRINTER 901-2

PRINTED SHEET STORAGE AREA 902

PASSAGE 95

OFFICE AREA 93

MACHINE ROOM 94

WAREHOUSE AREA 92

AIR CONDITIONER 923

SHEET RACK 921-2

SHEET RACK 921-1

TONER RACK 922-2

TONER RACK 922-1

FIG. 5

IMAGE PROCESSING APPARATUS

| PROCESS | STATUS | PRODUCT ID | WORK START TIME | OPERATOR ID | LEVEL | 601 ... |
|---|---|---|---|---|---|---|
| PRINTING | OPERATING | J0005 | 2023/6/7 09:30 | U104 | A | ... |
| CUTTING | OPERATING | J0002 | 2023/6/7 08:45 | U105 | A | ... |
| FOLDING | FREE | N/A | N/A | N/A | N/A | ... |
| BOOKBINDING | OPERATING | J0001 | 2023/6/7 09:10 | U002 | S | ... |
| ... | ... | ... | ... | ... | ... | ... |

PROCESS: BOOKBINDING

PROCESS: FOLDING

PROCESS: CUTTING

| PRODUCT ID | WORK START TIME | WORK END TIME | OPERATOR ID | LEVEL | ... |
|---|---|---|---|---|---|
| J0101 | 2023/6/6 09:10 | 2023/6/6 09:24 | U104 | A | ... |
| J0102 | 2023/6/6 09:15 | 2023/6/6 09:32 | U105 | A | ... |
| J0103 | 2023/6/6 09:20 | 2023/6/6 09:55 | U201 | B | ... |
| J0104 | 2023/6/6 09:30 | 2023/6/6 09:39 | U002 | S | ... |
| J0105 | 2023/6/6 09:35 | 2023/6/6 09:53 | U104 | A | ... |
| ... | ... | ... | ... | ... | ... |

INFORMATION PROCESSING APPARATUS, INFORMATION PROCESSING SYSTEM, INFORMATION PROCESSING METHOD, AND RECORDING MEDIUM FOR CONTROLLING JOB EXECUTION BASED ON AVAILABILITY OF A PLACEMENT AREA

CROSS-REFERENCE TO RELATED APPLICATIONS

This patent application is based on and claims priority pursuant to 35 U.S.C. § 119 (a) to Japanese Patent Application No. 2023-105226, filed on Jun. 27, 2023, in the Japan Patent Office, the entire disclosure of which is hereby incorporated by reference herein.

BACKGROUND

Technical Field

The present disclosure relates to an information processing apparatus, an information processing system, an information processing method, and a recording medium.

Related Art

The manufacturing and production industries produce a large quantity of products by sequentially executing processes on work products, such as raw materials or work-in-progress (WIP) items, for one unit of products. For example, at a printing facility such as a commercial printing facility, a large quantity of printed matter is produced by sequentially executing processes on printing sheets. In such printing facility, the work products output from the preceding process may be temporarily placed in a placement area, until the subsequent process starts. Since the time required for processing the work products differs in each process, the work products may remain in the placement area for a time longer than expected.

SUMMARY

Example embodiments include an information processing apparatus includes circuitry that: acquires a job to be executed by a job processing apparatus; determines whether or not there is a free space in a placement area, the placement area being an area where work products obtained by the job processing apparatus executing the job are to be placed; in a case where there is no free space in the placement area, calculates an estimated completion time of the job when the job is immediately started, and a space available time when the free space becomes available in the placement area; and in a case where the estimated completion time is equal to or later than the space available time, instructs the job processing apparatus to start executing the job.

Example embodiments include an information processing method, including: acquiring a job to be executed by a job processing apparatus; determining whether or not there is a free space in a placement area, the placement area being an area where work products obtained by the job processing apparatus executing the job are to be placed; in a case where there is no free space in the placement area, calculating an estimated completion time of the job when the job is immediately started, and a space available time when the free space becomes available in the placement area; and in a case where the estimated completion time is equal to or later than the space available time, instructing the job processing apparatus to start executing the job.

Example embodiments include a non-transitory recording medium storing a plurality of instructions which, when executed by one or more processors, causes the one or more processors to perform an information processing method including: acquiring a job to be executed by a job processing apparatus; determining whether or not there is a free space in a placement area, the placement area being an area where work products obtained by the job processing apparatus executing the job are to be placed; in a case where there is no free space in the placement area, calculating an estimated completion time of the job when the job is immediately started, and a space available time when the free space becomes available in the placement area; and in a case where the estimated completion time is equal to or later than the space available time, instructing the job processing apparatus to start executing the job.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 1 is a schematic diagram illustrating an example of a printing facility;

FIG. 5 is a block diagram illustrating another example of the hardware configuration of the image forming apparatus;

FIG. 6 is a block diagram illustrating an example hardware configuration of a computer;

FIG. 8 is a table illustrating an example of work status information;

FIG. 9 is a diagram illustrating an example of work history information;

Figure 2:
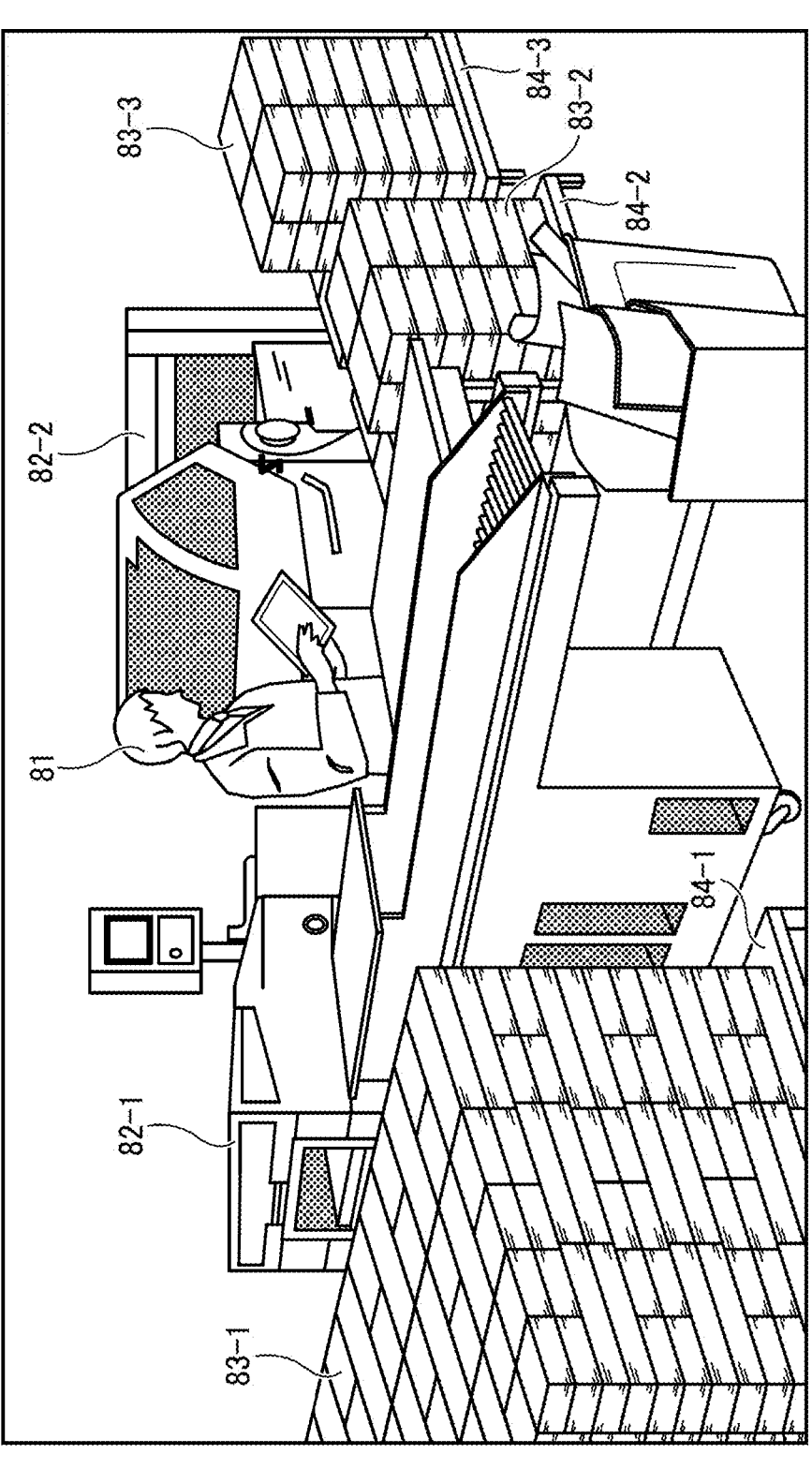
FIG. 2 is a diagram for explaining operations performed in the printing facility of FIG. 1.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A job management system according to the embodiments manages jobs at a manufacturing site, which sequentially executes processes on work products to produce one unit of products. In the following, an example case in which the job management system is provided at a facility where a large quantity of printed matter is produced as the product is described. Such facility may be a printing facility or a data center. For the descriptive purpose, it is referred to as a printing facility.

The printing facility executes printing and post-processing to produce printed matter such as books and booklets. The printing process, for example, prints images of print data on a large number of printing sheets to output printed sheets. The post-processing process, for example, executes cutting, folding, and bookbinding on the printed sheets. In this embodiment, the printing process is an example of preceding process, and the post-processing process is an example of subsequent process. The job management system in this embodiment manages a print job for executing the printing process. The use of the job management system is not limited to the above-described process. For example, the job management system may manage a job for executing another process such as a cutting process, a folding process, or a bookbinding process.

Overview of Printing Facility

Referring to FIG. 1, the printing facility is described. FIG. 1 is a schematic diagram illustrating a printing facility 9 as an example of the printing facility.

As illustrated in FIG. 1, the printing facility 9 is divided into a printing area 90, a bookbinding area 91, a warehouse area 92, and an office area 93. The office area 93 includes a machine room 94. The areas 90 to 93 of the printing facility 9 are arranged such that a person can enter or exit to or from each area via a passage 95.

In the printing area 90, two printers 901-1 and 901-2, a printed sheet storage area 902, and an air conditioner 903 are provided. In the bookbinding area 91, two cutting machines 911-1 and 911-2, two folding machines 912-1 and 912-2, and a bookbinding machine 913 are provided. In the warehouse area 92, two sheet racks 921-1 and 921-2, two toner racks 922-1 and 922-2, and an air conditioner 923 are provided.

In this disclosure, the printers 901-1 and 901-2, the cutting machines 911-1 and 911-2, the folding machines 912-1 and 912-2, the sheet racks 921-1 and 921-2, and the toner racks 922-1 and 922-2 are referred to as the printer 901, the cutting machine 911, the folding machine 912, the sheet rack 921, and the toner rack 922, respectively, when it is not necessary to identify the specific one.

The number of each of the printer 901, the cutting machine 911, the folding machine 912, the bookbinding machine 913, the sheet rack 921, and the toner rack 922 illustrated in FIG. 1 is an example, and may be arbitrarily increased or decreased according to the size or the printing capacity of the printing facility 9. The types of machines installed in the printing area 90 and the bookbinding area 91 are merely examples, such that any desired machine may be installed, which may be used in the printing process or the post-processing process. The type of the rack installed in the warehouse area 92 is an example, and may be arbitrarily changed, for example, according to the type or the quantity of the equipment required in the printing facility 9. Further, the respective areas in the printing facility 9 may be partitioned in any manner. Alternatively, the respective areas in the printing facility 9 may be located in any number of floors, or may be provided without partitioning.

The flow of processes in the printing facility 9 is described. In the printing process, an operator, such as an employee of the printing facility 9, first confirms that printing materials such as printing sheets and toner required for a print job are set in the printer 901 in the printing area 90. When the printing sheet or toner is insufficient, the operator takes out the required quantity of the printing sheets or toner from the sheet rack 921 or the toner rack 922 in the warehouse area 92, and sets the printing sheets or toner in the printer 901 to be used.

After confirming that the printing materials such as printing sheets and toner are sufficiently set, the operator operates the printer 901 to print images of desired print data on a desired number of printing sheets. The printed sheets output from the printer 901 are temporarily stored in the printed sheet storage area 902. The printing process then ends.

When the printing process is completed, in the post-processing process, the operator carries the printed sheets from the printed sheet storage area 902 into the bookbinding area 91. The printed sheets carried into the bookbinding area 91 are temporarily placed in a work area W provided for the cutting machine 911. Next, the operator operates the cutting machine 911 to cut the printed sheets.

Subsequently, the operator places the cut printed sheets in a work area W provided for the folding machine 912, and operates the folding machine 912 to fold the cut printed sheets. Next, the operator places the folded printed sheets in a work area W provided for the bookbinding machine 913, and operates the bookbinding machine 913 to perform bookbinding processing on the folded printed sheets. The post-processing process then ends. In another example in which the printed matter is a saddle-stitched booklet, in the post-processing process, the folding process by the folding machine 912, the bookbinding process by the bookbinding machine 913, and the cutting (finish cutting) by the cutting machine 911 are performed in this order after the printing process. The post-processing process may be performed in any order using any desired machines to produce various types of printed matter.

In addition, an accessory such as a cover, a belly band, or a sales card may be attached to the printed matter such as books or booklets. The printed matter is then packed and shipped from the printing facility 9.

FIG. 2 is a diagram illustrating an example of operations performed at the printing facility 9. For the descriptive purposes, a room illustrated in FIG. 2 is an example of the bookbinding area 91 where the post-processing is performed. As illustrated in FIG. 2, in the printing facility 9, work-in-process storage areas 84-1 to 84-3 (examples of a placement area) are provided near two machines 82-1 to 82-2 used in the post-processing process. The work-in-process storage areas 84-1 to 84-3 are for placing a large quantity of printed sheets 83-1 to 83-3. The printed sheets 83-1 to 83-3 are examples of work products to be processed or output from the machines 82-1 and 82-2. In this example, the machine 82-1 performs the preceding process, and the machine 82-2 performs the subsequent process.

For example, a stack of the printed sheets 83-1, each being the work product of the preceding process before the process to be executed by the machine 82-1, is placed in the work-in-process storage area 84-1 near the machine 82-1. An operator 81 takes out the printed sheets 83-1 from the work-in-process storage area 84-1, inputs the printing sheets 83-1 to the machine 82-1, and instructs the machine 82-1 to execute the preceding process on the printed sheets 83-1. The operator 81 places a stack of the printed sheets 83-2 output from the machine 82-1 on the work-in-process storage area 84-2. Subsequently, the operator 81 takes out the printed sheets 83-2 from the work-in-process storage area 84-2, inputs the printing sheets 83-2 to the machine 82-2, and instructs the machine 82-2 to execute the subsequent process. The operator 81 places a stack of the printed sheets 83-3 output from the machine 82-2 on the work-in-process storage area 84-3.

Since the placement area where the work products is placed requires a physical space, the quantity of the work products that can be placed is limited. If there is no free space in the placement area where the work products can be placed, processing of the work products, which will output such work products to be placed in such placement area after the processing, cannot be started. Further, since a certain amount of work products are processed in a batch in each process, a certain time is required from the start to the end of each process. If the preceding process starts after confirming that there is a free space in the placement area, the free space remains unused until the preceding process is completed. Accordingly, there is a room for improving the use efficiency of the placement area. If the time when the free space becomes available in the placement area can be known in advance, the preceding process can be started to be finished at a timing when the free space becomes available.

Figure 3:
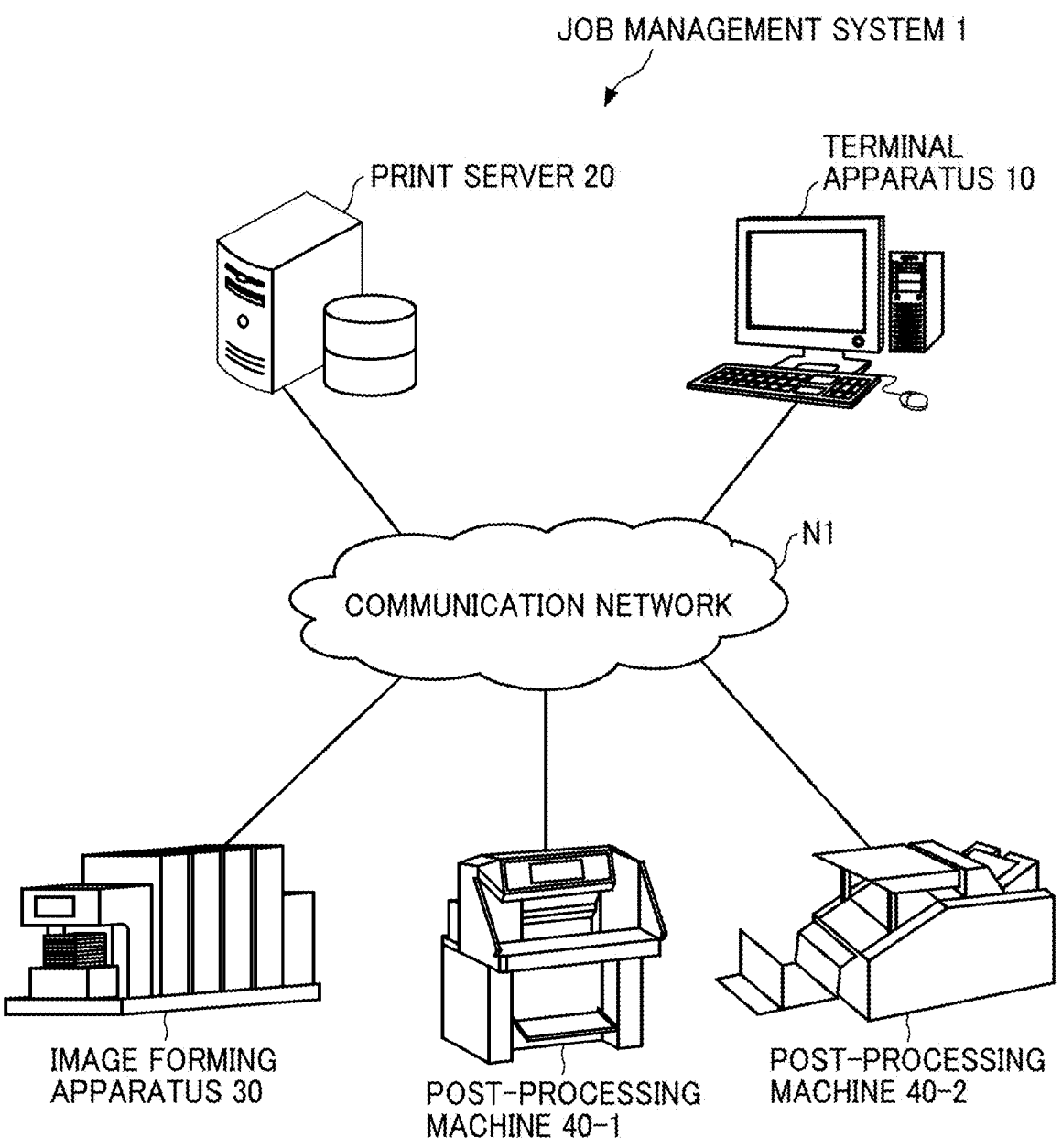
FIG. 3 is a block diagram illustrating an example configuration of a job management system provided for the printing facility.

It is preferable to increase the use efficiently of a placement area where the work products are placed. In view of this, the job management system 1 controls a time to start the job of the preceding process, when it is determined that the estimated completion time when the job of the preceding process is completed is equal to or before the space available time when a free space becomes available in the placement area for the work product. With this configuration, the time during when the free space remains unused is shortened, thus improving the use efficiency of the placement area.
Overall Configuration of Job Management System The overall configuration of the job management system 1 is described with reference to FIG. 3. FIG. 3 is a diagram illustrating an example overall configuration of the job management system 1.

As illustrated in FIG. 3, the job management system 1 includes a terminal apparatus 10, a print server 20 (an example of an information processing apparatus), an image forming apparatus 30 (an example of a job processing apparatus), and one or more post-processing machines 40-1 and 40-2 (collectively referred to as the post-processing machine 40). The terminal apparatus 10, the print server 20, the image forming apparatus 30, and the post-processing machine 40 are connected to one another via a communication network N1. The communication network N1 enables the connected machines to communicate with one another.

In the following description, when the post-processing machines 40 need to be distinguished from one another, different reference numbers are used such as the post-processing machine 40-1 and the post-processing machine 40-2.

The communication network N1 is, for example, a wired communication network such as the Internet, a local area network (LAN), or a wide area network (WAN). The communication network N1 may include not only the wired communication network, but also a wireless communication network such as a wireless local area network (LAN) or a short-range wireless communication network, or a mobile communication network based on such as worldwide interoperability for microwave access (WiMAX), long term evolution (LTE), or 5th (5G) generation.

The terminal apparatus 10 is an example of an information processing apparatus operated by the operator. An example of the terminal apparatus 10 is a computer. Other examples of the terminal apparatus 10 include a smartphone and a tablet PC. The terminal apparatus 10 is installed in, for example, the printing area 90, the office area 93, and the machine room 94, in the printing facility 9 of FIG. 1.

The print server 20, which is an example of an information processing apparatus, spools a print job for executing printing by the image forming apparatus 30, and transmits the print job to the image forming apparatus 30 according to a job scheduler. An example of the print server 20 is a computer. The print server 20 is installed in, for example, the machine room 94 illustrated in FIG. 1.

In the job management system 1, an information processing apparatus in which software called a digital front end (DFE) is installed may be provided between the print server 20 and the image forming apparatus 30. The digital front end is software, communicable with the image forming apparatus 30, which creates drawing data by a raster image processor (RIP) engine based on a print job, and transmits the drawing data to the image forming apparatus 30.

The image forming apparatus 30 is an example of the job processing apparatus that prints an image of print data on a printing sheet according to a print job received from the print server 20 (or the DFE). The print data is electronic data including layout information of characters and images to be printed on the printing sheet.

The image forming apparatus 30 is installed in, for example, the printing area 90 illustrated in FIG. 1.

In the present embodiment, it is assumed that the image forming apparatus 30 is for commercial printing. The image forming apparatus 30 may be, for example, an electrophotographic printer, an inkjet printer, an offset printer, or a multifunction peripheral. The term "commercial printing" refers to a business field in which printing companies or print shops print and provide printed matters as products upon receiving orders and payments from clients. Examples of the printed matters as the products include advertisements, direct mail, posters, pamphlets, and books.

The post-processing machine 40 is another example of a job processing apparatus that performs predetermined post-processing on the printed sheet printed by the image forming apparatus 30. In a case where multiple types of post-processing are performed on the printed sheet, multiple post-processing machines 40 corresponding to the multiple types of post-processing may be provided. The post-processing includes, for example, a cutting process, a folding process, and a bookbinding process. The post-processing machine 40 is installed in, for example, the bookbinding area 91 illustrated in FIG. 1.

For example, the post-processing machine 40-1 is a cutting machine, and the post-processing machine 40-2 is a folding machine. The post-processing machine 40-1 executes, as the subsequent process, the post-processing on the printed sheet produced by the image forming apparatus 30 in the preceding process. The post-processing machine 40-2 further executes, as the subsequent process, the post-processing on the processed printed sheet produced by the post-processing machine 40-1 in the preceding process.

The terminal apparatus 10 and the print server 20 do not have to be implemented as the information processing apparatuses as described above. The terminal apparatus 10 and the print server 20 may each be any suitable apparatus at least having a communication function. Other examples of the terminal apparatus 10 and the print server 20 include, but not limited to, an output device such as a Projector (PJ), an Interactive White Board (a white board having an electronic whiteboard function capable of mutual communication), and a digital signage, a Head Up Display (HUD) device, an industrial machine, an imaging device, a sound collecting device, a medical device, a network home appliance, an automobile (connected car), a notebook Personal Computer (PC), a mobile phone, a smartphone, a tablet terminal, a game console, a Personal Digital Assistant (PDA), a digital camera, a wearable PC or a desktop PC.

The overall configuration of the image forming system 1 illustrated in FIG. 3 is an example, and various system configurations may be employed depending on applications and purposes. For example, in the job management system 1, one or more of the terminal apparatuses 10, the print server 20, the image forming apparatus 30, and the post-processing machine 40 may be provided more than one. For example, the print server 20 may be implemented by multiple computers or may be implemented as a cloud computing service. Further, the functions performed by the terminal apparatus 10, the print server 20, the image forming apparatus 30, and the post-processing machine 40 illustrated in FIG. 3 may be divided or distributed differently among the devices of the job management system 1.

Hardware Configuration of Job Management System

Figure 4:
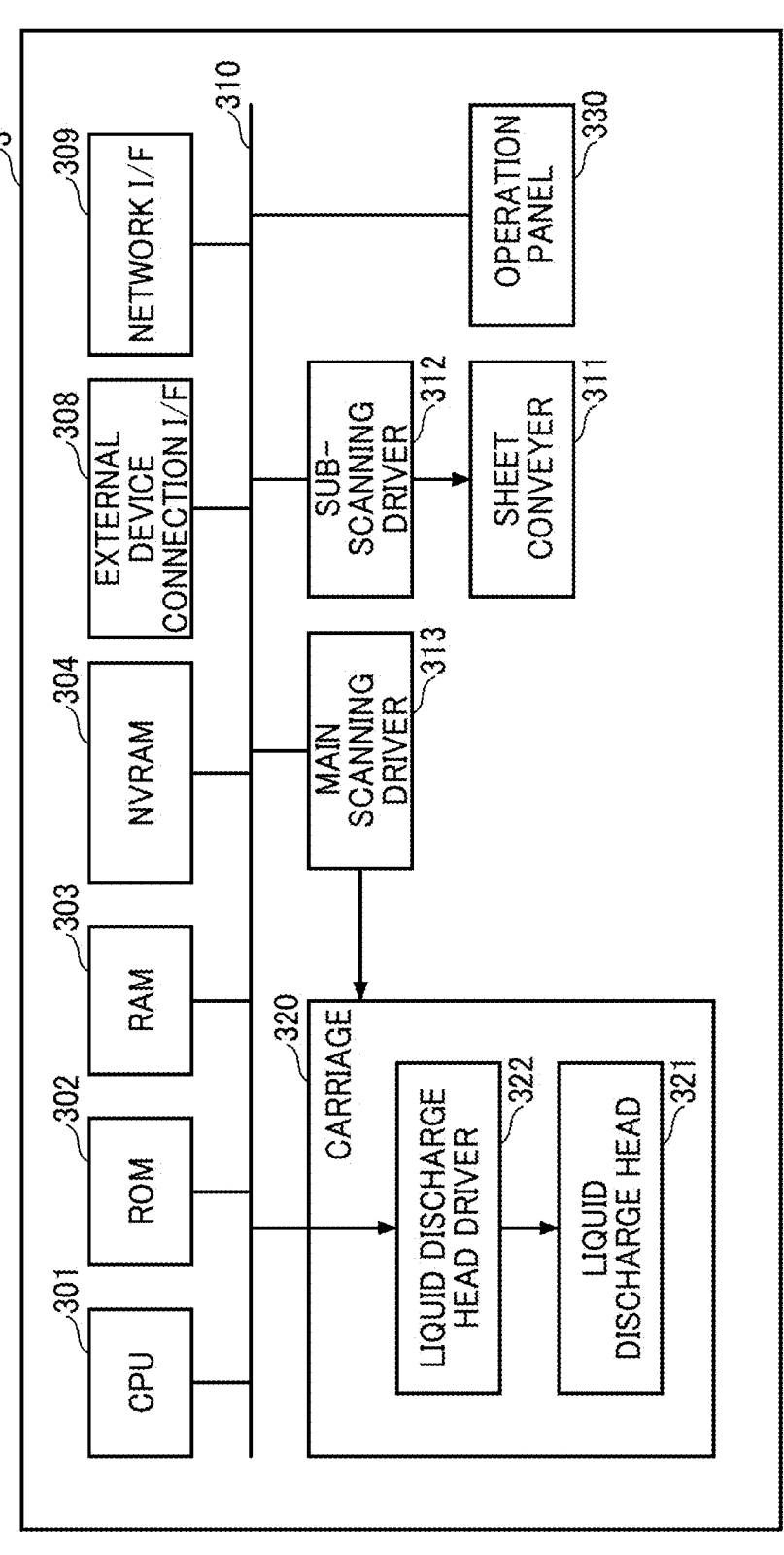
FIG. 4 is a block diagram illustrating an example hardware configuration of an image forming apparatus.
Figure 5:
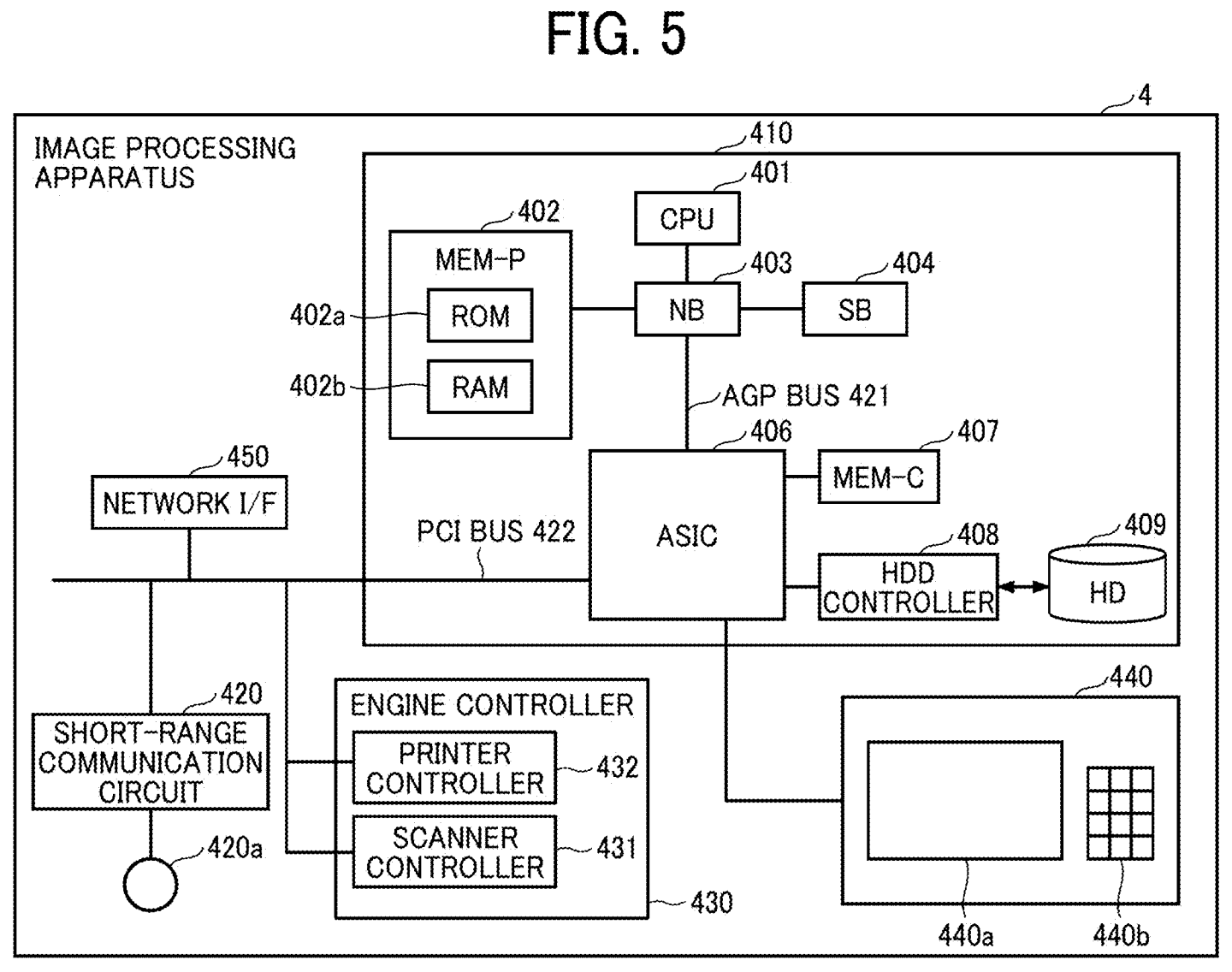
Figure 6:
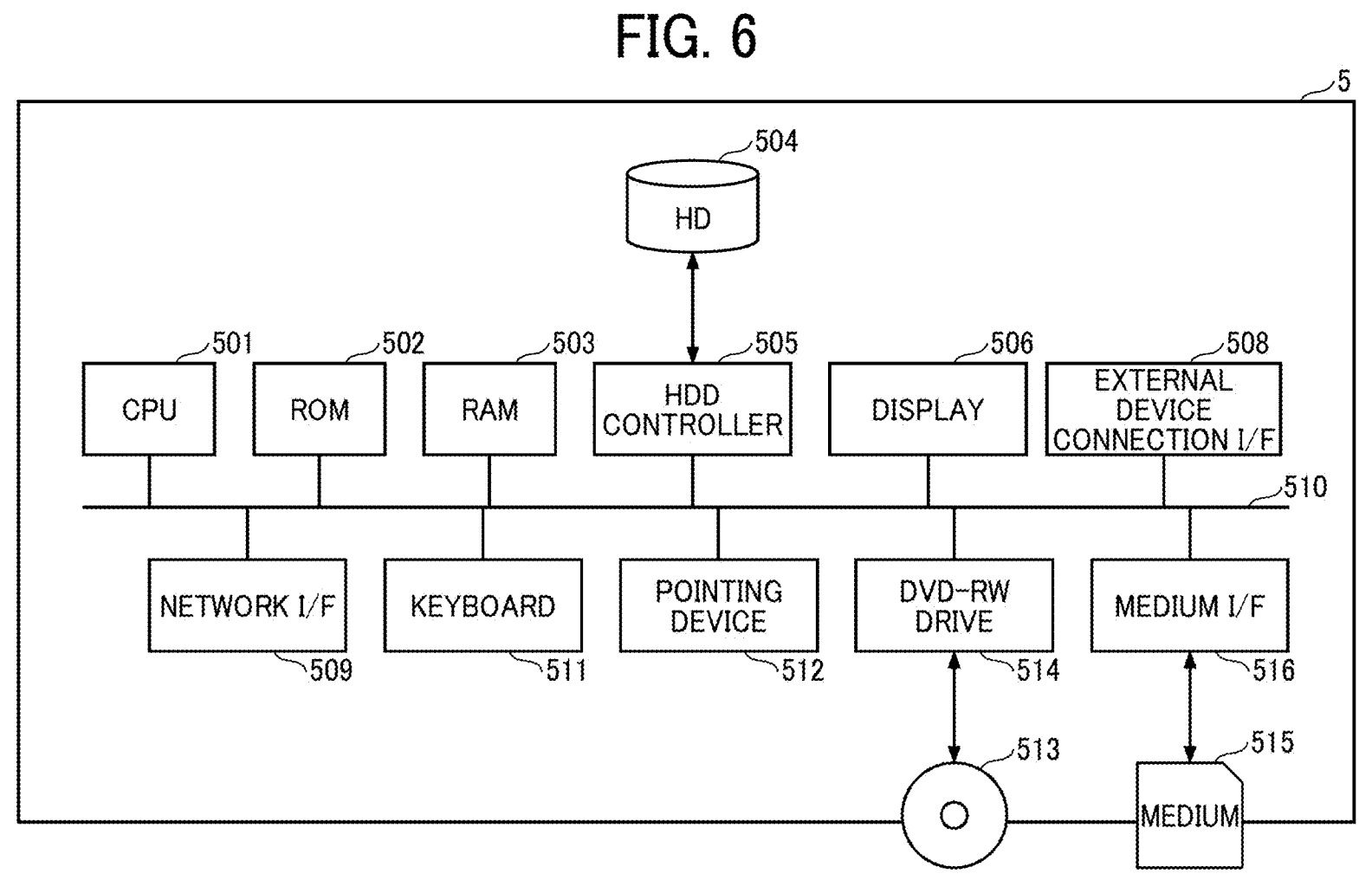

Referring to FIGS. 4 to 6, an example hardware configuration of the job management system 1 is described.

Image Forming Apparatus

Liquid Discharge Apparatus

FIG. 4 is a block diagram illustrating an example hardware configuration of the image forming apparatus. Specifically, FIG. 4 illustrates a hardware configuration of a liquid discharge apparatus (inkjet printer) 3 as an example of the image forming apparatus 30.

As illustrated in FIG. 4, the liquid discharge apparatus 3 includes a central processing unit (CPU) 301, a read only memory (ROM) 302, a random access memory (RAM) 303, a non-volatile random access memory (NVRAM) 304, an external device connection interface (I/F) 308, a network I/F 309, and a bus line 310. The liquid discharge apparatus 3 further includes a sheet conveyer 311, a sub-scanning driver 312, a main scanning driver 313, a carriage 320, and an operation panel 330. The carriage 320 includes a liquid discharge head 321 and a liquid discharge head driver 322.

The CPU 301 controls entire operation of the liquid discharge apparatus 3. The ROM 302 stores a software program used for executing the CPU 301 such as an initial program loader (IPL). The RAM 303 is used as a work area for the CPU 301. The NVRAM 304 stores various kinds of data such as a control program, such that the data is kept stored even when the power of the liquid discharge apparatus 3 is cut off. The external device connection I/F 308 is connected to a personal computer (PC), for example, via a universal serial bus (USB) cable to transmit or receive control signals to or from the PC, or receive data to be printed from the PC. The network I/F 309 is an interface circuit that controls communication of data through the communication network N1 such as the Internet. The bus line 310 is an address bus or a data bus, which electrically connects the elements illustrated in FIG. 4 such as the CPU 301.

The sheet conveyer 311 includes, for example, rollers and motors that drive the rollers, and conveys the printing sheet in the sub-scanning direction along a conveyance path in the liquid discharge apparatus 3. The sub-scanning driver 312 controls the movement of the sheet conveyer 311 in the sub-scanning direction. The main scanning driver 313 controls the movement of the carriage 320 in the main scanning direction.

The liquid discharge head 321 of the carriage 320 has a plurality of nozzles for discharging liquid such as ink. The liquid discharge head 321 is mounted on the carriage 320 such that a discharge surface (a nozzle face) of the liquid discharge head 321 faces the printing sheet. While moving in the main scanning direction, the liquid discharge head 321 discharges the liquid onto the printing sheet conveyed intermittently in the sub-scanning direction. Specifically, the liquid discharge head 321 discharges the liquid onto a predetermined position of the printing sheet to form an image on the printing sheet. The liquid discharge head driver 322 controls the driving of the liquid discharge head 321.

The operation panel 330 includes, for example, a touch panel and one or more alarm lamps. The touch panel displays current settings or a selection screen, and receives user input.

The liquid discharge head driver 322 may not be mounted on the carriage 320, but may be connected to the liquid discharge head 321 via the bus line 310. Any one of the functions of the main scanning driver 313, the sub-scanning driver 312, and the liquid discharge head driver 322 may be controlled by the CPU 301 that operates according to a program.

Electrophotographic Printer

FIG. 5 is a block diagram illustrating another example of the hardware configuration of the image forming apparatus 30. Specifically, FIG. 5 illustrates a hardware configuration of an electrophotographic printer 4 (including a commercial printer or a multifunction peripheral) as another example of the image forming apparatus 30.

As illustrated in FIG. 5, the electrophotographic printer 4 includes a controller 410, a short-range communication circuit 420, an engine controller 430, an operation panel 440, and a network I/F 450.

The controller 410 includes a CPU 401 as a main processor, a system memory (MEM-P) 402, a north bridge (NB) 403, a south bridge (SB) 404, an application specific integrated circuit (ASIC) 406, a local memory (MEM-C) 407 as a storage device, a hard disk drive (HDD) controller 408, and a HD 409 as a storage device. The NB 403 and the ASIC 406 are connected to each other via an accelerated graphics port (AGP) bus 421.

The CPU 401 is a processor that controls entire operation of the electrophotographic printer 4.

The NB 403 connects the CPU 401 to the MEM-P 402, the SB 404, and the AGP bus 421. The NB 403 includes a memory controller that controls reading or writing of various data from or to the MEM-P 402, a Peripheral Component Interconnect (PCI) master, and an AGP target.

The MEM-P 402 includes a ROM 402a as a memory that stores program and data for implementing various functions of the controller 410. The MEM-P 402 further includes a RAM 402b as a memory that deploys the program and data, or as a drawing memory that stores drawing data for printing. The program stored in the RAM 402b may be stored in any computer-readable recording medium, such as a compact disc-read-only memory (CD-ROM), compact disc-recordable (CD-R), or digital versatile disc (DVD), in an installable or executable file format for distribution.

The SB 404 is a bridge that connects the NB 403 to PCI devices and peripheral devices. The ASIC 406 is an integrated circuit (IC) dedicated to image processing and includes hardware elements for image processing. The ASIC 406 serves as a bridge to connect the AGP bus 421, a PCI bus 422, the HDD controller 408, and the MEM-C 407 to each other. The ASIC 406 includes a PCI target, an AGP master, an arbiter (ARB) as a central processor of the ASIC 406, a memory controller that controls the MEM-C 407, a plurality of direct memory access controllers (DMACs), and a PCI unit. For example, the DMACs convert the coordinates of image data with a hardware logic to rotate an image based on the image data. The PCI unit transfers data between a scanner controller 431 and a printer controller 432 through the PCI bus 422. The ASIC 406 may be connected to a universal serial bus (USB) interface, or the Institute of Electrical and Electronics Engineers 1394 (IEEE1394) interface.

The MEM-C 407 is a local memory used as a buffer for image data to be printed or a code buffer. The HD 409 is a storage for storing image data, font data used in printing, and forms. The HD 409 controls reading or writing of data with respect to the HD 409 under control of the CPU 401. The AGP bus 421 is a bus interface for a graphics accelerator card, which has been proposed to accelerate graphics processing. Through directly accessing the MEM-P 402 by high throughput, the speed of the graphics accelerator card increases.

The short-range communication circuit 420 is provided with an antenna 420a. The short-range communication circuit 420 is a communication circuit in compliance with, for example, near field communication (NFC) or BLUETOOTH.

The engine controller 430 includes the printer controller 432. The engine controller 430 may further include the scanner controller 431. The operation panel 440 includes a display panel 440a and a hard keypad 440b. The display panel 440a is, for example, a touch panel that displays current settings or a selection screen and receives user input. The hard keypad 440b includes, for example, a numeric keypad and a start key. The numeric keypad receives assigned values of image forming parameters such as an image density parameter. The start key receives an instruction to start copying, for example. The controller 410 controls the entire electrophotographic printer 4. For example, the controller 410 controls drawing, communication, and inputs through the operation panel 440. The scanner controller 431, when provided, and the printer controller 432 each performs various image processing, such as error diffusion or gamma conversion. The electrophotographic printer 4 may switch between various functions such as setting, color adjustment, and schedule management of printing and maintenance in addition to the printing function, according to an application switch key of the operation panel 440. Additionally, or alternatively, the electrophotographic printer 4 may sequentially switch between a document box function, a copying function, and a facsimile communication function for selection. The network I/F 450 is an interface circuit that controls communication of data with various external devices through the communication network N1. The short-range communication circuit 420 and the network I/F 450 are electrically connected to the ASIC 406 through the PCI bus 422.

Computer

The terminal apparatus 10 and the print server 20 are each implemented by, for example, a computer 5. FIG. 6 is a block diagram illustrating an example hardware configuration of the computer 5.

As illustrated in FIG. 6, the computer 5 includes a CPU 501, a ROM 502, a RAM 503, a hard disk (HD) 504, a hard disk drive (HDD) controller 505, a display 506, an external device connection interface (I/F) 508, a network I/F 509, a bus line 510, a keyboard 511, a pointing device 512, a digital versatile disk rewritable (DVD-RW) drive 514, and a medium I/F 516.

The CPU 501 controls entire operation of the computer 5. The ROM 502 stores a program for controlling the CPU 501, such as an IPL. The RAM 503 is used as a work area for the CPU 501. The HD 504 stores various data such as software programs. The HDD controller 505 controls reading and writing of various data from and to the HD 504 under control of the CPU 501.

The display 506 displays various information such as a cursor, menu, window, character, and image. The external device connection I/F 508 is an interface circuit that connects the computer 5 to various extraneous sources. Examples of the external devices include, but not limited to, a universal serial bus (USB) memory and a printer. The network I/F 509 is an interface circuit that controls communication of data with an external device through the communication network N1. The bus line 510 is an address bus or a data bus, which electrically connects the elements illustrated in FIG. 6 such as the CPU 501.

The keyboard 511 is an example of an input device provided with a plurality of keys for allowing a user to enter characters, numerical values, or various instructions. The pointing device 512 is an example of an input device that allows the user to select or execute a specific instruction, select a target for processing, or move a cursor being displayed. The DVD-RW drive 514 reads and writes various data from and to a DVD-RW 513, which is an example of a removable storage medium. The removable storage medium is not limited to the DVD-RW and may be a digital versatile disc-recordable (DVD-R), for example. The medium I/F 516 controls reading and writing (storing) of data from and to a storage medium 515 such as a flash memory.

Functional Configuration of Job Management System

Figure 7:
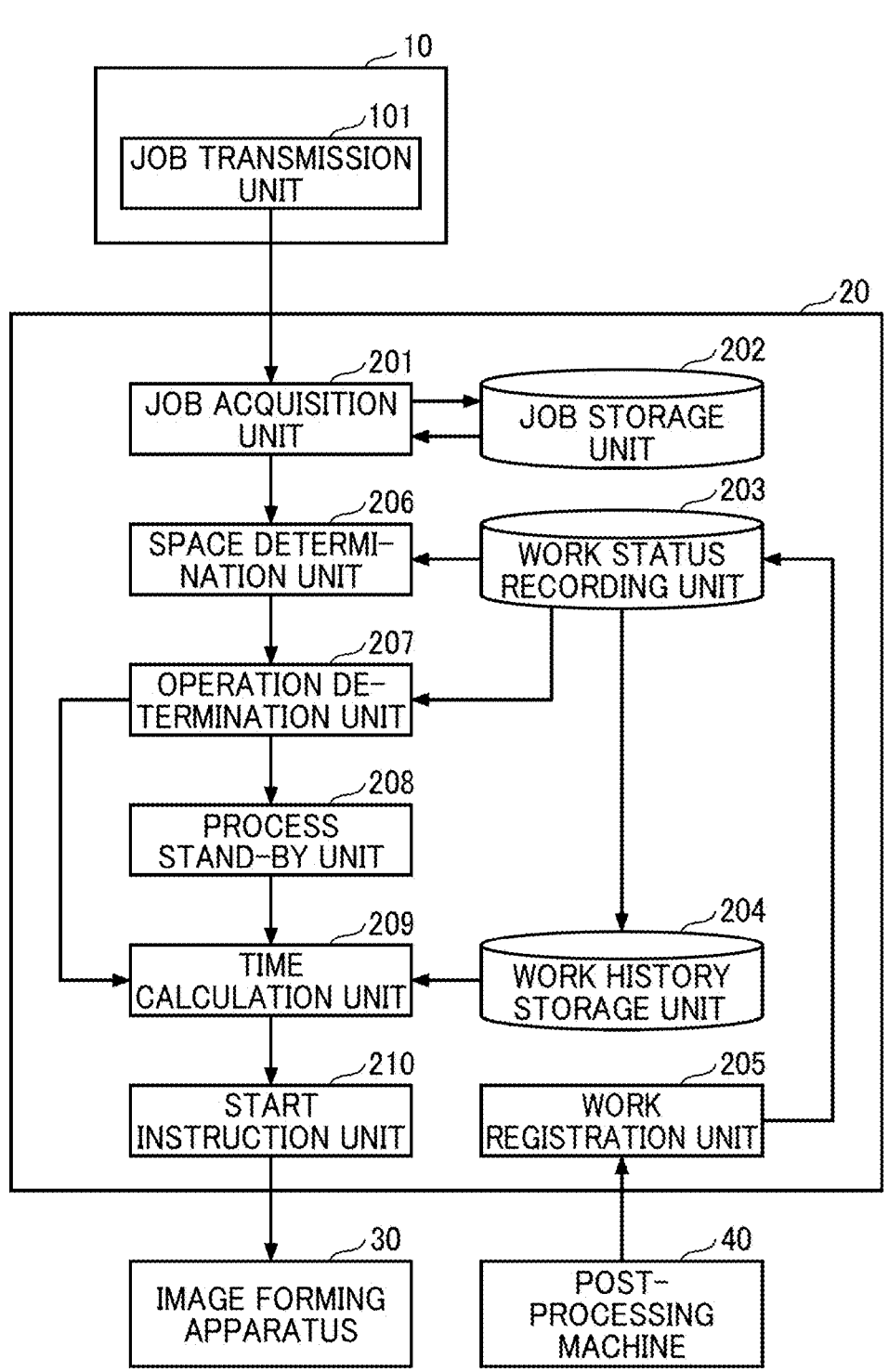
FIG. 7 is a block diagram illustrating an example functional configuration of the job management system of FIG. 3.

Referring to FIG. 7, an example functional configuration of the job management system 1 is described. FIG. 7 is a block diagram illustrating an example functional configuration of the job management system 1.

Terminal Apparatus

As illustrated in FIG. 7, the terminal apparatus 10 includes a job transmission unit 101.

The job transmission unit 101 is implemented by, for example, processing that is executed by the CPU 501 and the network I/F 509 according to a program loaded from the ROM 502 onto the RAM 503 illustrated in FIG. 6.

In this example, the job transmission unit 101 receives an input of a print job according to an operation by the operator. The print job includes print data representing the content to be printed, sheet information indicating a type of printing sheet to be used, and print settings such as the number of sheets to be printed, color, printing side (single-sided or double-sided), and print magnification. The job transmission unit 101 transmits the received print job to the print server 20.

Functional Configuration of Print Server

As illustrated in FIG. 7, the print server 20 includes a job acquisition unit 201, a job storage unit 202, a work status recording unit 203, a work history storage unit 204, a work registration unit 205, a space determination unit 206, an operation determination unit 207, a process stand-by unit 208, a time calculation unit 209, and a start instruction unit 210.

The job storage unit 202, the work status recording unit 203, and the work history storage unit 204 are implemented by, for example, the HD 504 illustrated in FIG. 6. The reading and writing of data from and to the HD 504 are performed, for example, under control of the HDD controller 505.

The job acquisition unit 201, the work registration unit 205, the space determination unit 206, the operation determination unit 207, the process stand-by unit 208, the time calculation unit 209, and the start instruction unit 210 are implemented by, for example, processing executed by the CPU 501 that operates in cooperation with the network I/F 509 according to a program loaded from the ROM 502 to the RAM 503 illustrated in FIG. 6.

The job acquisition unit 201 receives an input of the print job received from the terminal apparatus 10. The job acquisition unit 201 stores the print job for which the input is received in the job storage unit 202. The job acquisition unit 201 monitors the status (progress) of the job currently executed by the image forming apparatus 30, and acquires one of the print jobs stored in the job storage unit 202 when the image forming apparatus 30 becomes ready to execute another print job.

The job storage unit 202 stores the print job received by the job acquisition unit 201.

The work status recording unit 203 stores work status information for each job, which is performed by the job processing apparatus. The work status information is information regarding the status of each job performed in each process. The work status information includes, for example, information indicating a specific process, information indicating a status, information indicating a work product being processed, and information regarding a work start time and an operator. The example of the work status information is described below referring to FIG. 8.

The work history storage unit 204 stores work history information. The work history information is information regarding a history of jobs previously executed in each process. The work history information includes, for each process, information indicating a processed work product, and information regarding a work start time, a work end time, and an operator, for example.

The work registration unit 205 receives work information indicating the progress of the job (for example, "the subsequent job") from the post-processing machine 40. For example, in response to receiving the work information indicating that the subsequent job has been started from the post-processing machine 40, the work registration unit 205 generates the work status information. The work registration unit 205 then stores the work status information that is generated in the work status recording unit 203. Further, in response to receiving the work information indicating that the subsequent job is finished from the post-processing machine 40, the work registration unit 205 generates the work history information regarding the completed job. The work registration unit 205 then stores the work history information that is generated in the work history storage unit 204.

The space determination unit 206 determines whether there is a free space in a work-in-process storage area (an example of a placement area) where the printed sheets output from the image forming apparatus 30 that performs the print job can be placed. The printed sheets are an example of the work products, which have been processed by and output from the job processing apparatus that performs the preceding process. The free space is a space where the printed sheets obtained by executing the print job acquired by the job acquisition unit 201 can be placed, before the subsequent process. The space determination unit

206 determines whether or not there is a free space based on the work status information read from the work status recording unit 203.

The operation determination unit 207 determines the operation status of the subsequent job. In one example, the operation status indicates whether or not the post-processing machine 40, which will execute the post-processing immediately after the printing process, is executing the subsequent job. The operation status further indicates whether or not a delay has occurred in the post-processing machine 40 that will execute another post-processing after the subsequent job. In this example, the operation determination unit 207 determines whether or not the post-processing machine 40-1 is operating. The operation determination unit 207 further determines whether or not a delay has occurred in the post-processing machine 40-2.

The process stand-by unit 208 holds the processing to be performed by the print server 20 until a predetermined condition is satisfied. When the operation determination unit 207 determines that the post-processing machine 40-1 is not operating, the process stand-by unit 208 holds the operation until the post-processing machine 40-1 starts operating.

When the time at which the print job will be completed after the print job is immediately started (hereinafter, referred to as "estimated completion time") is earlier than the time at which the free space becomes available in the work-in-process storage area (hereinafter, referred to as "space available time"), the process stand-by unit 208 holds the operation for a time period that is a difference between the estimated completion time and the space available time. That is, the process stand-by unit 208 waits to issue the instruction to start the printing job, until the estimated completion time becomes equal to or later than the space available time.

When the space determination unit 206 determines that there is no free space, the time calculation unit 209 calculates the estimated completion time of the print job when the print job is immediately started in the image forming apparatus 30 and the space available time when the free space becomes available in the placement area. The time calculation unit 209 calculates the estimated completion time based on the print job and the processing speed of the image forming apparatus 30. The time calculation unit 209 calculates the space available time based on the work status information read from the work status recording unit 203 and the work history information read from the work history storage unit 204.

When the estimated completion time calculated by the time calculation unit 209 is equal to or later than the space available time, the start instruction unit 210 transmits the print job acquired by the job acquisition unit 201 to the image forming apparatus 30. In other words, the start instruction unit 210 instructs the image forming apparatus 30 to start the print job.

Work Status Information

Referring to FIG. 8, an example of the work status information is described. FIG. 8 is a table that stores the work status information 601.

As illustrated in FIG. 8, the work status information 601 includes, as data items, a process name, a status, a product ID, a work start time, an operator ID, and a level. The process name identifies a specific process that executes the job. The status indicates a current status of the job. The product ID is identification information for identifying one unit of the work products. The work start time is a time when the job is started. The operator ID is an identifier of the operator operating the job processing apparatus to execute the job. The level is an index indicating the proficiency of the operator operating the job processing apparatus.

The operator ID is set in, for example, a personal identification card that is always held by the operator during work. The operator ID may be written in an integrated circuit (IC) chip incorporated in the personal identification card, for example. The operator ID may be set in a code (for example, a barcode or a two-dimensional code) printed on the personal identification card.

Once the operator ID is obtained, the level of the operator may be obtained, for example, from information associating the operator ID and the level for each operator.

The product ID is printed on, for example, a work instruction sheet attached to the products, i.e., one unit of the work products. The product ID is set in, for example, a code printed on the work instruction sheet. The product ID may be written in an IC chip attached to the work instruction sheet, for example.

When starting the work using the post-processing machine 40, the operator instructs the post-processing machine 40 to read the personal identification card of the operator. Further, the operator instructs the post-processing machine 40 to read the work instruction sheet to execute the job on one unit of the work products with the product ID on the work instruction sheet. The operator ID and the product ID may be read by, for example, a code scanner or an IC card reader, which may be connected to an external interface provided with the post-processing machine 40.

When the job is started, the post-processing machine 40 transmits the work information indicating the progress of the job to the print server 20. In response to reception of the work information, the work status recording unit 203 of the print server 20 stores the work status information. The level of the operator may not be transmitted to the print server 20, as long as the level of the operator can be obtained using the operator ID.

The above-described process is performed similarly when the job processing apparatus is the image forming apparatus 30.

Work History Information

Referring to FIG. 9, the work history information is described. FIG. 9 is a diagram illustrating work history information 602 as an example of the work history information.

As illustrated in FIG. 9, the work history information 602 includes, as data items, the product ID, the work start time, a work end time, the operator ID, and the level. In this example, the work history information 602 of the previously executed jobs is created for each process. Alternatively, the work history information 602, which additionally includes information indicating each process, may be created for multiple processes performed to produce the finished product. While not illustrated, the work history information 602 may further include information regarding the printing process.

When the job is completed, the post-processing machine 40 the work information indicating completion of the job to the print server 20. In response to receiving the work information indicating completion of the job, the work status recording unit 203 of the print server 20 stores the work history information. Since the data items of the work history information are partly the same as those of the work status information, the print server 20 does not have to receive all data items of work history information from the post-processing machine 40. For example, as long as the product ID is received with information indicating completion of the job, and the work end time is obtained, the print server 20 is able to enter other types of information referring to the work status information.

The above-described process is performed similarly when the job processing apparatus is the image forming apparatus 30.

Job Management Processing

Figure 10:
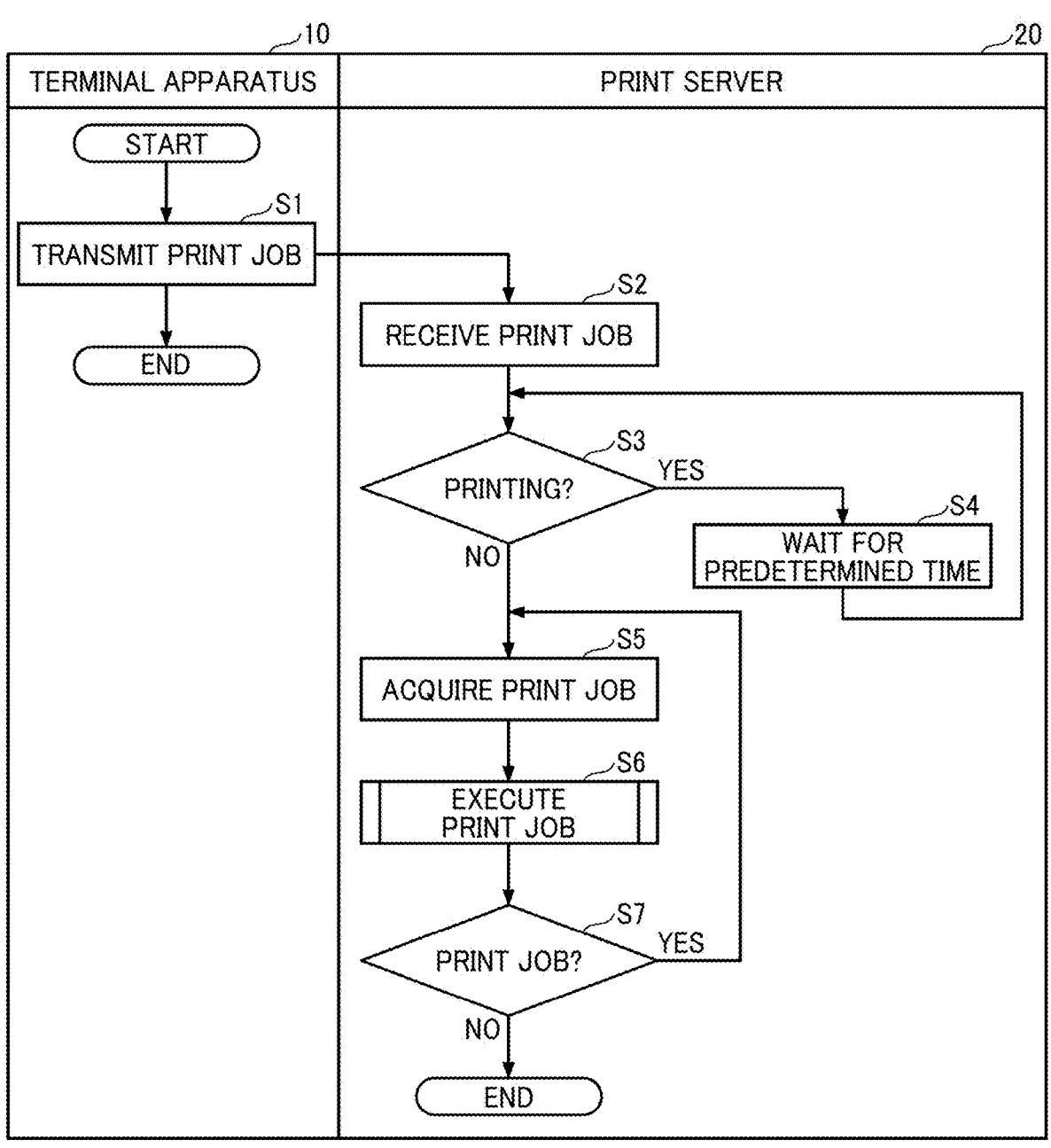
FIG. 10 is a flowchart illustrating example processing of managing a job.
Figure 11:
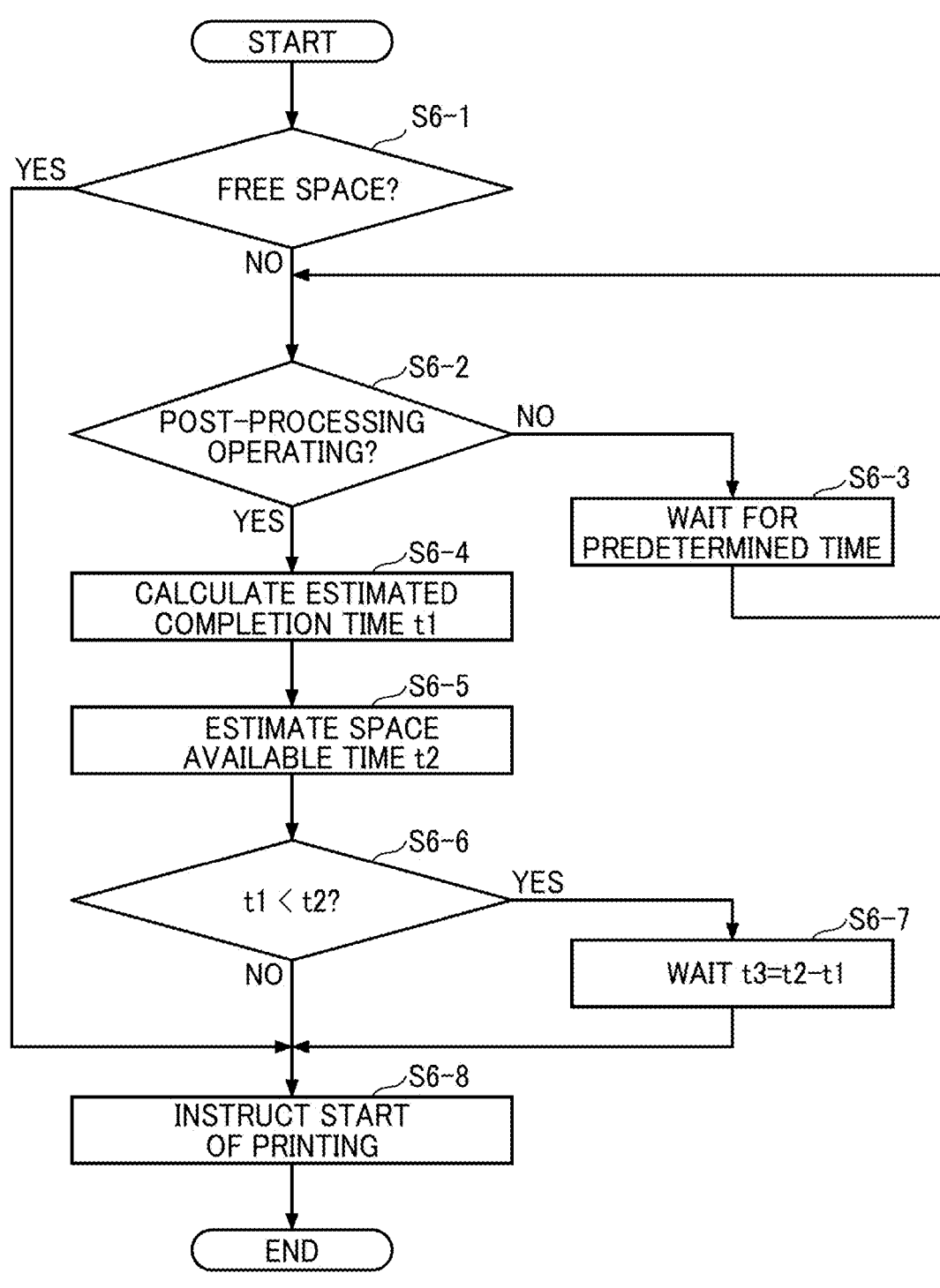
FIG. 11 is a flowchart illustrating example processing of executing a job.

Example processing of managing a job, executed by the job management system 1, is described with reference to FIGS. 10 and 11. FIG. 10 is a flowchart illustrating example processing of managing a job.

At S1, the job transmission unit 101 of the terminal apparatus 10 receives an input of a print job in response to an operation by the operator. The job transmission unit 101 transmits the print job, which is input, to the print server 20.

At S2, the job acquisition unit 201 of the print server 20 receives the print job from the print server 20. The job acquisition unit 201 further receives an input of the print job. The job acquisition unit 201 stores the print job for which the input is received in the job storage unit 202.

At S3, the job acquisition unit 201 of the print server 20 determines whether the image forming apparatus 30 is executing a print job. When the image forming apparatus 30 is executing the print job (YES), the job acquisition unit 201 proceeds the operation to S4. When the image forming apparatus 30 is not executing the print job (NO), the job acquisition unit 201 proceeds the operation to S5.

At S4, the process stand-by unit 208 of the print server 20 waits for a predetermined time. The stand-by time may be arbitrarily set in advance, and may be, for example, about one minute to several minutes. After the predetermined time elapses, the process stand-by unit 208 returns the operation to S3. The job acquisition unit 201 determines again whether the image forming apparatus 30 is executing the print job. In this way, the job acquisition unit 201 waits until the image forming apparatus 30 is in the status where no job is executed.

At S5, the job acquisition unit 201 of the print server 20 reads one print job from the job storage unit 202. The job acquisition unit 201 may read the print job stored earliest. The job acquisition unit 201 deletes the read print job from the job storage unit 202.

At S6, the print server 20 controls the image forming apparatus 30 to execute the print job acquired at S5. At this time, the print server 20 controls the start time of the print job, based on availability of the free space in the work-in-process storage area, onto which the printed sheets to be produced by executing the print job are placed.

Job Execution Processing

The processing to execute the job (S6 of FIG. 10) is described in more detail with reference to FIG. 11. FIG. 11 is a flowchart illustrating example processing of executing the job.

At S6-1, the space determination unit 206 of the print server 20 determines whether there is a free space in the work-in-process storage area, where the printed sheets printed by the image forming apparatus 30 are to be placed. When there is a free space in the work-in-process storage area (YES), the operation proceeds to S6-8. When there is no free space in the work-in-process storage area (NO), the operation proceeds to S6-2.

Specifically, the space determination unit 206 determines whether or not there is a free space as follows. The space determination unit 206 first acquires the quantity of the printed sheets, which are placed in the work-in-process storage area at a predetermined reference time. The quantity of placed printed sheets may be counted and input to the print server 20, manually by the operator. Alternatively, the space determination unit 206 may estimate the quantity of the placed printed sheets based on an image obtained by capturing the work-in-process storage area with an image capturing device such as a camera.

The space determination unit 206 calculates the quantity of the printed sheets, which are generated by executing the print job after the reference time. The space determination unit 206 obtains the quantity of the printed sheets produced by the print job after the reference time, by counting the number of printed sheets included in the print job having been executed. The space determination unit 206 further calculates the quantity of the printed sheets produced by the subsequent job after the reference time. The subsequent job is any job that is performed after the print job, and is the post-processing process, for example. The space determination unit 206 may obtain the quantity of the printed sheets produced by the subsequent job based on the product ID included in the work history information corresponding to the subsequent job. Similarly, the space determination unit 206 may obtain the quantity of the printed sheets produced by the printing job, from the work history information.

The space determination unit 206 adds the quantity of the printed sheets produced by the print job, to the quantity of the printed sheets having been placed in the placement area at the reference time, to obtain the added quantity. The space determination unit 206 further subtracts, from the added quantity, the quantity of the printed sheets produced by the subsequent job. The quantity of the printed sheets, which are currently placed in the work-in-process storage area, are thus obtained. Subsequently, the space determination unit 206 subtracts the calculated quantity of the printed sheets currently placed, from the maximum quantity of the printed sheets that can be placed in the work-in-process storage area. The quantity of the printed sheets, which can be additionally placed in the work-in-process storage area at the present time, are thus obtained.

The space determination unit 206 calculates the quantity of the printed sheets to be produced by the print job acquired at S5, and compares the calculated quantity with the quantity of the printed sheets that can be additionally placed. When the quantity of the printed sheets to be produced by the print job is equal to or smaller than the quantity of the printed sheets that can be additionally placed, the space determination unit 206 determines that there is a free space. When the quantity of the printed sheets to be produced by the print job is larger than the quantity of the printed sheets that can be additionally placed, the space determination unit 206 determines that there is no free space.

At S6-2, the operation determination unit 207 of the print server 20 determines whether the post-processing machine 40 is operating normally. Specifically, the operation determination unit 207 reads the status information from the work status recording unit 203. Next, the operation determination unit 207 determines whether or not the status of the job, currently performed by the post-processing machine 40-1, is "operating". The operation determination unit 207 further determines whether or not a delay has occurred in the process performed by the post-processing machine 40-2.

The operation determination unit 207 determines that the post-processing machine 40 is not operating normally when the status of the job performed by the post-processing machine 40-1 is not "operating" (for example, indicating an error) or when a delay occurs in the post-processing machine 40-2. On the other hand, when the status of the job performed by the post-processing machine 40-1 is operating and when no delay occurs in the post-processing machine

40-2, the operation determination unit 207 determines that the post-processing machine 40 is operating normally. When the post-processing machine 40 is not operating normally (NO), the operation determination unit 207 proceeds the operation to S6-3. When the post-processing machine 40-1 is operating normally (YES), the operation determination unit 207 proceeds the operation to step S6-4.

At S6-3, the process stand-by unit 208 of the print server 20 waits for a predetermined time period. The stand-by time period may be arbitrarily set in advance, and may be, for example, about one minute to several minutes. When the predetermined time period elapses, the process stand-by unit 208 returns the operation to S6-2. The operation determination unit 207 determines again whether or not the post-processing machine 40-1 is operating normally. In this way, the operation determination unit 207 waits until the post-processing machine 40-1 starts operating.

At S6-4, the time calculation unit 209 of the print server 20 calculates the estimated completion time t1 of the print job acquired at S5. Specifically, the time calculation unit 209 calculates a print processing time required for processing the print job based on the processing speed (for example, the number of sheets printed per unit time) of the image forming apparatus 30. The processing speed of the image forming apparatus 30 may be calculated in advance based on a catalog value of the image forming apparatus 30, and stored in any desired memory.

The time calculation unit 209 adds the print processing time to the current time. Accordingly, the time calculation unit 209 calculates the estimated completion time t1. The print processing time may be determined in advance according to the type of the print job, and stored in any desired memory. For example, the print processing time may be set to an average value of print processing times previously obtained by executing the same type of print job.

At S6-5, the time calculation unit 209 of the print server 20 calculates a space available time t2 of the work-in-process storage area. For example, the time calculation unit 209 calculates the time at which the post-processing machine 40-1 starts the subsequent job (hereinafter, also referred to as "estimated start time") as the space available time.

In this example, the print job and the subsequent job are processed on a pallet-by-pallet basis so that a sufficient space will be available when the subsequent job is started. That is, one unit of the work products corresponds to one pallet of printed sheets. The pallet is a fixture for stacking printed sheets. The processing is executed on a pallet-by-basis, such that one pallet of printing sheets are printed by the print job. When the subsequent job starts, the free space equivalent to one pallet of printed sheets will be created.

Specifically, the time calculation unit 209 reads the work history information from the work history storage unit 204. Next, the time calculation unit 209 calculates the average work time it takes for the subsequent job to be completed based on the work history information.

For example, the average work time may be calculated as an average of work times it took for the operator operating the post-processing machine 40-1 to complete processing one unit of the printed sheets.

In one example, the work times used for calculation are the work times of a specific operator currently operating the post-processing machine 40-1. Specifically, the work times of the specific operator can be obtained from the work history information, by calculating a sum of a difference between the work start time and the work end time of the previous jobs performed by the specific operator identified with the operator ID.

In another example, the work times used for calculation are the work times of operators having the same proficiency as the operator currently operating the post-processing machine 40-1. The proficiency of the operator is indicated by the level of the operator, which can be acquired from the work history information. Specifically, the work times of the operators having the same proficiency can be obtained from the work history information, by calculating a sum of a difference between the work start time and the work end time of the previous jobs performed by the operators having the same level with the level of the specific operator.

In another example, the work times used for calculation are the work times of operators registered to the job management system 1. Specifically, the work times of the registered operators can be obtained from the work history information, by calculating a sum of a difference between the work start time and the work end time of the previous jobs performed by the registered operators.

The time calculation unit 209 may add a predetermined time interval to the average work time of the subsequent job. The predetermined time interval includes, for example, a work time it takes for taking out the printed sheets to be processed from the work-in-process storage area, a work time it takes for placing the printed sheets processed by the post-processing machine 40-1 in the next work-in-process storage area, etc. The predetermined time interval may be determined in advance and stored in any desired memory.

Next, the time calculation unit 209 acquires the work start time when the current subsequent job started, from the work status information. The time calculation unit 209 adds the average work time of the subsequent job to the work start time of the current subsequent job. Thus, the time calculation unit 209 obtains the estimated start time of the next subsequent job (that is, the space available time t2).

At S6-6, the time calculation unit 209 of the print server 20 compares the estimated completion time t1 calculated at S6-4, with the space available time t2 calculated at S6-5. The time calculation unit 209 determines whether the estimated completion time t1 is earlier than the space available time t2 (that is, whether t1<t2 is true or false) based on a result of the comparison. When the estimated completion time t1 is earlier than the space available time t2 (YES), the time calculation unit 209 proceeds the operation to S6-7. On the other hand, when the estimated completion time t1 is later than or equal to the space available time t2 (NO), the time calculation unit 209 proceeds the operation to S6-8.

At S6-7, the process stand-by unit 208 of the print server 20 calculates a time difference t3 (=t2–t1) between the estimated completion time t2 and the space available time t1. The process stand-by unit 208 waits for the time difference t3. If the print job is started after waiting for the time period equal to the time difference t3 from the current time, the estimated completion time t1 of the print job will be after the space available time t2, and the time during when the free space remains unused in the work-in-process storage area can be minimized.

At S6-8, the start instruction unit 210 of the print server 20 transmits the print job acquired at S5 to the image forming apparatus 30. The image forming apparatus 30 receives the print job from the print server 20 and prints an image of the print data on the printing sheet according to the print job.

The description continues with reference to FIG. 10. At S7, the job acquisition unit 201 of the print server 20 determines whether or not another print job is stored in the job storage unit 202. That is, the job acquisition unit 201 determines whether or not there is an unprocessed print job. When there is an unprocessed print job (YES), the job acquisition unit 201 returns the operation to S3. On the other hand, when there is no unprocessed print job (NO), the job acquisition unit 201 ends the job management processing.

Specific Examples

The example job execution processing is now described in detail. In this example, it is assumed that the print processing time required for one print job is 12 minutes, and the work time required for one subsequent job is 15 minutes.

The first specific example is an example in which a print job is immediately started in response to reception of the print job. First, the subsequent job (for example, the cutting process) to process the printed sheets produced by the previous print job is started at 8:45. A current print job is received at 8:50. The current time is 8:50.

In this case, the estimated completion time t1 of the current print job is 9:02 (8:50+12 minutes). The space available time t2 of the work-in-process storage area is 9:00 (8:45+15 minutes).

Since the estimated completion time t1 of the current print job is later than the space available time t2, the current print job is started immediately at 8:50.

If the print job is started after the space becomes available in the work-in-process storage area, the print job will be started at the space available time t2 (9:00), and the print job is completed at 9:12 (9:00+12 minutes). Since the estimated completion time t1 of this specific example is 9:02, a time period during when the free space remains unused will be shortened by 10 minutes.

The second specific example is an example in which a print job is started after waiting. First, the subsequent job (for example, the cutting process) to process the printed sheets produced by the previous print job is started at 8:45. A current print job is received at 8:45. The current time is 8:45.

In this case, the estimated completion time t1 of the current print job is 8:57 (8:45+12 minutes). The space available time t2 of the work-in-process storage area is 9:00 (8:45+15 minutes).

Since the estimated completion time t1 of the current print job is earlier than the space available time t2, the print job waits for three minutes (9:00-8:57) and is started at 8:48.

As the estimated completion time t1 of the current print job is now 9:00 (8:48+12 minutes), a time period during when the free space remains unused is shortened by 12 minutes.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

For example, in addition to the image forming apparatus 30, other examples of the job processing apparatus include a production apparatus, a manufacturing apparatus, a processing machine, and a processing apparatus, which may be used in various industries. The post-processing machine 40 may be any device that performs post-processing on a work-in-process product that has been processed by any one of the job processing apparatuses. In alternative to the printed matter, the product may be any product, which is produced, manufactured, processed or treated in various industries.

As described above, the printed sheets obtained by the image forming apparatus 30 executing the print job are placed in a placement area. When there is no free space in the placement area, the print server 20 determines whether the estimated completion time of the print job when the print job is immediately started, is later than the space available time of the placement area. When the estimated completion time is later than the space available time, the print server 20 instructs the image forming apparatus 30 to start the print job. That is, even when there is no free space in the placement area, the print server 20 immediately instructs the start of the print job, based on a determination that the free space will be available substantially at the same time as the time when the print job is completed. Accordingly, the placement area where the work products are placed can be efficiently used.

When the estimated completion time is earlier than the space available time, the print server 20 waits for a time period equal to a time difference between the estimated completion time and the space available time. In one example, the print server 20 may calculate the estimated start time of the subsequent job to be executed after the current job, as the space available time. This can minimize the time during when a free space remains unused in the placement area for the work products.

In one example, the print server 20 may calculate the estimated start time based on the work history information of the subsequent job. In one example, the print server 20 may calculate the estimated start time based on the average work time of the subsequent job. The average work time may be an average of times it took for a specific operator to complete processing of one unit of the work products. Alternatively, the average work time may be an average of times it took for each operator having the same proficiency to complete processing of one unit of the work products. As described above, the print server 20 can accurately calculate the time when a free space becomes available in the placement area of the work product.

The print server 20 may determine the status of each process executed after the job when there is no free space in the placement area. The print server 20 can thus accurately determine whether or not the time when a free space becomes available in the placement area of the work product can be calculated.

The other examples of the information processing apparatus are follows.

In the first aspect, the information processing apparatus includes a job acquisition unit configured to acquire a job to be executed by a job processing apparatus; a space determination unit configured to determine whether or not there is a free space in a placement area, the placement area being an area where work products obtained by the job processing apparatus executing the job are to be placed; a time calculation unit configured to, in a case where there is no free space in the placement area, calculate an estimated completion time after immediately starting the job, and a space available time when the free space becomes available in the placement area; and a start instruction unit configured to, in a case where the estimated completion time is after the space available time, instruct the job processing apparatus to start executing the job.

In the second aspect, the information processing apparatus of the first aspect further includes a process stand-by unit configured to wait for a time period equal to a time difference between the estimated completion time and the space available time, in a case where the estimated completion time is earlier than the space available time.

In the third aspect, in the information processing apparatus of the first aspect or the second aspect, the time calculation unit calculates, as the space available time, an estimated start time of a subsequent job to be executed after completion of the job.

In the fourth aspect, in the information processing apparatus of the third aspect, the time calculation unit calculates the estimated start time based on history information regarding a plurality of subsequent job previously executed.

In the fifth aspect, in the information processing apparatus of the fourth aspect, the time calculation unit calculates the estimated start time based on an average work time of the subsequent jobs previously executed.

In the sixth aspect, in the information processing apparatus of the fifth aspect, the average work time is an average of times it took for an operator to complete processing one unit of the work products.

In the seventh aspect, in the information processing apparatus of the fifth aspect, the average work time is an average of times it took for one or more operators having the same proficiency as the proficiency of the operator of the subsequent job to complete processing one unit of the work products.

In the eighth aspect, the information processing apparatus of any one of the first to seventh aspects further includes an operation determination unit configured to determine an operation status of at least one subsequent job performed after completion of the job, in a case where there is no free space in the placement area.

The apparatuses or devices described in one or more embodiments are just one example of plural computing environments that implement the one or more embodiments disclosed herein. In some embodiments, the print server 20 includes a plurality of computing devices, such as a server cluster. The multiple computing devices may be configured to communicate with each other via any type of communications link, including a network, shared memory, etc., and may perform the processes disclosed herein.

The functionality of the elements disclosed herein may be implemented using circuitry or processing circuitry which includes general purpose processors, special purpose processors, integrated circuits, ASICs ("Application Specific Integrated Circuits"), FPGAs ("Field-Programmable Gate Arrays"), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of a FPGA or ASIC.

The invention claimed is:

1. An information processing apparatus, comprising:

circuitry configured to:

acquire a job to be executed by a job processing apparatus to produce a product;

acquire, from the job processing apparatus, operation status information including a processing speed and an operation state of each of the machines, and an image obtained by capturing a placement area for placing the product with an image capturing device;

determine whether or not there is a free space in the placement area based on the image, the placement area being an area where work products obtained by the job processing apparatus executing the job are to be placed;

in a case where there is no free space in the placement area, calculate an estimated completion time of the job when the job is immediately started, and a space available time when the free space becomes available in the placement area; and in a case where the estimated completion time is equal to or later than the space available time, instruct the job processing apparatus to start executing the job and control the job processing apparatus to place the product in the placement area after the space available time, wherein the circuitry is further configured to, in a case where the estimated completion time is earlier than the space available time, wait for a time period equal to a time difference between the estimated completion time and the space available time, and instruct the job processing apparatus to start executing the job when the time period elapses and control the job processing apparatus to place the product immediately after the space available time.

2. The information processing apparatus of claim 1, wherein the circuitry is configured to calculate, as the space available time, an estimated start time of a subsequent job to be executed on the work products.

3. The information processing apparatus of claim 2, wherein the circuitry is configured to calculate the estimated start time based on history information regarding a plurality of subsequent jobs previously executed.

4. The information processing apparatus of claim 3, wherein the circuitry is configured to calculate the estimated start time based on an average work time of the subsequent jobs previously executed.

5. The information processing apparatus of claim 4, wherein the average work time is an average of times it took for an operator of the subsequent job to complete processing one unit of the work products.

6. The information processing apparatus of claim 4, wherein the average work time is an average of times it took for one or more operators having the same proficiency as the proficiency of the operator of the subsequent job to complete processing one unit of the work products.

7. The information processing apparatus of claim 1, wherein, in a case where there is no free space in the placement area, the circuitry is further configured to determine an operation status of at least one subsequent job performed by another job processing apparatus after completion of the job.

8. An information processing system, comprising:

the information processing apparatus of claim 1; and a terminal apparatus comprising another circuitry configured to transmit the job to be executed by the job processing apparatus to the information processing apparatus via a network.

9. An information processing method, comprising:

acquiring a job to be executed by a job processing apparatus to produce a product;

acquiring, from the job processing apparatus, operation status information including a processing speed and an operation state of each of the machines, and an image obtained by capturing a placement area for placing the product with an image capturing device;

determining whether or not there is a free space in the placement area based on the image, the placement area being an area where work products obtained by the job processing apparatus executing the job are to be placed;

in a case where there is no free space in the placement area, calculating an estimated completion time of the job when the job is immediately started, and a space available time when the free space becomes available in the placement area; and in a case where the estimated completion time is equal to or later than the space available time, instructing the job processing apparatus to start executing the job and controlling the job processing apparatus to place the product in the placement area after the space available time, the method further comprises calculating, as the space available time, an estimated start time of a subsequent job to be executed on the work products.

10. A non-transitory recording medium storing a plurality of instructions which, when executed by one or more processors, causes the one or more processors to perform an information processing method comprising:

acquiring a job to be executed by a job processing apparatus;

acquiring, from the job processing apparatus, operation status information including a processing speed and an operation state of each of the machines, and an image obtained by capturing a placement area for placing the product with an image capturing device;

determining whether or not there is a free space in a placement area, the placement area being an area where work products obtained by the job processing apparatus executing the job are to be placed;

in a case where there is no free space in the placement area, calculating an estimated completion time of the job when the job is immediately started, and a space available time when the free space becomes available in the placement area; and in a case where the estimated completion time is equal to or later than the space available time, instructing the job processing apparatus to start executing the job and controlling the job processing apparatus to place the product in the placement area after the space available time, wherein the information processing method further comprises, in a case where there is no free space in the placement area, determining an operation status of at least one subsequent job performed by another job processing apparatus after completion of the job.

* * * * *